(12) United States Patent
Simpson

(10) Patent No.: US 6,659,490 B1
(45) Date of Patent: Dec. 9, 2003

(54) FIFTH WHEEL TRAILER HITCH ADAPTOR SYSTEM

(75) Inventor: Benny M. Simpson, Taylor, MI (US)

(73) Assignee: Douglas B. Simpson, Wayne, MI (US)

( * ) Notice: Subject to any disclaimer, the term of this patent is extended or adjusted under 35 U.S.C. 154(b) by 46 days.

(21) Appl. No.: 10/006,281

(22) Filed: Dec. 7, 2001

(51) Int. Cl.⁷ ................................................. B60F 3/10
(52) U.S. Cl. .............................. 280/416.1; 280/415.1; 280/460.1
(58) Field of Search .......................... 280/415.1, 416.1, 280/460.1, 901

(56) References Cited

U.S. PATENT DOCUMENTS

| | | |
|---|---|---|
| 2,127,313 A | 8/1938 | Sowle |
| 3,826,516 A | 7/1974 | Weber |
| 3,941,407 A | 3/1976 | Breford |
| D289,514 S | 4/1987 | Capps |
| 4,826,199 A | 5/1989 | Chambers |
| 4,950,010 A * | 8/1990 | Denny ........................ 293/117 |
| 5,788,257 A | 8/1998 | Meyerhofer |
| 6,213,492 B1 * | 4/2001 | Ceccarelli, III .......... 280/491.5 |

* cited by examiner

Primary Examiner—Lesley D. Morris
Assistant Examiner—L. Lum

(57) ABSTRACT

A fifth wheel trailer hitch adaptor system for providing a safer and more stable way to tow a fifth wheel trailer. The fifth wheel trailer hitch adaptor system includes a vehicle. A receiver is secured to the vehicle. The receiver has an aperture extending through the receiver. A fifth wheel trailer hitch member has a base portion. A connection bar is secured to the base portion. The connection bar has a distal portion extending outwardly from the base portion. The distal portion is insertable through the aperture in the receiver. The distal portion has a hole extending through the distal portion. A pin member is couplable to the distal portion through the hole whereby the connection bar is secured to the receiver.

1 Claim, 2 Drawing Sheets

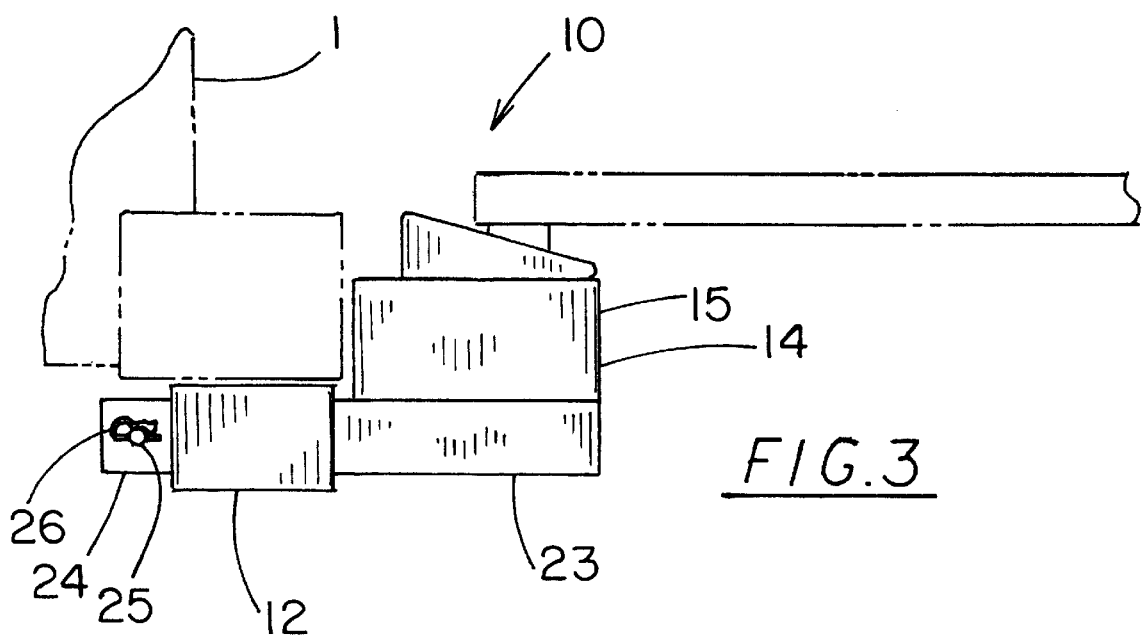

FIFTH WHEEL TRAILER HITCH ADAPTOR SYSTEM

BACKGROUND OF THE INVENTION

1. Field of the Invention

The present invention relates to fifth wheel trailer hitches and more particularly pertains to a new fifth wheel trailer hitch adaptor system for providing a safer and more stable way to tow a fifth wheel trailer.

2. Description of the Prior Art

The use of fifth wheel trailer hitches is known in the prior art. U.S. Pat. No. 5,788,257 describes an apparatus for towing a fifth wheel trailer. Another type of fifth wheel trailer hitch is U.S. Pat. No. 3,941,407 having a mounting plate rigidly coupled to the center rear of the vehicle. Another type of fifth wheel trailer hitch is U.S. Pat. No. Des. 289,514 showing a fifth wheel. Another type of fifth wheel trailer hitch is U.S. Pat. No. 2,127,313 having a fifth wheel mounting being mounted in the bed of a vehicle for connecting to a fifth wheel trailer. Another type of fifth wheel trailer hitch is U.S. Pat. No. 3,826,516 having a mounting structure that is mountable within the bed of a vehicle for towing a fifth wheel trailer. Another type of fifth wheel trailer hitch is U.S. Pat. No. 3,941,407 having a hitch for mounting in the bed of a vehicle for towing a fifth wheel trailer.

While these devices fulfill their respective, particular objectives and requirements, the need remains for a system that has certain improved features distributes the load evenly across the rear of the vehicle and allows a bed of the vehicle to be available for storage.

SUMMARY OF THE INVENTION

The present invention meets the needs presented above by providing a fifth wheel trailer hitch member with multiple connection bars that are insertable into a receiver for spreading the force of the load along the length of the receiver as well as positioning the fifth wheel trailer out of the bed of the vehicle.

Still yet another object of the present invention is to provide a new fifth wheel trailer hitch adaptor system that permits the connection point between a vehicle and fifth wheel trailer to be positioned behind of vehicle for safer driving.

Even still another object of the present invention is to provide a new fifth wheel trailer hitch adaptor system that spreads the force of the fifth wheel trailer being pulled across the entire rear of the vehicle.

To this end, the present invention generally comprises a vehicle. A receiver is secured to the vehicle. The receiver has an aperture extending through the receiver. A fifth wheel trailer hitch member has a base portion. A connection bar is secured to the base portion. The connection bar has a distal portion extending outwardly from the base portion. The distal portion is insertable through the aperture in the receiver. The distal portion has a hole extending through the distal portion. A pin member is couplable to the distal portion through the hole whereby the connection bar is secured to the receiver.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention in use.

DESCRIPTION OF THE PREFERRED EMBODIMENT

Figure 1:
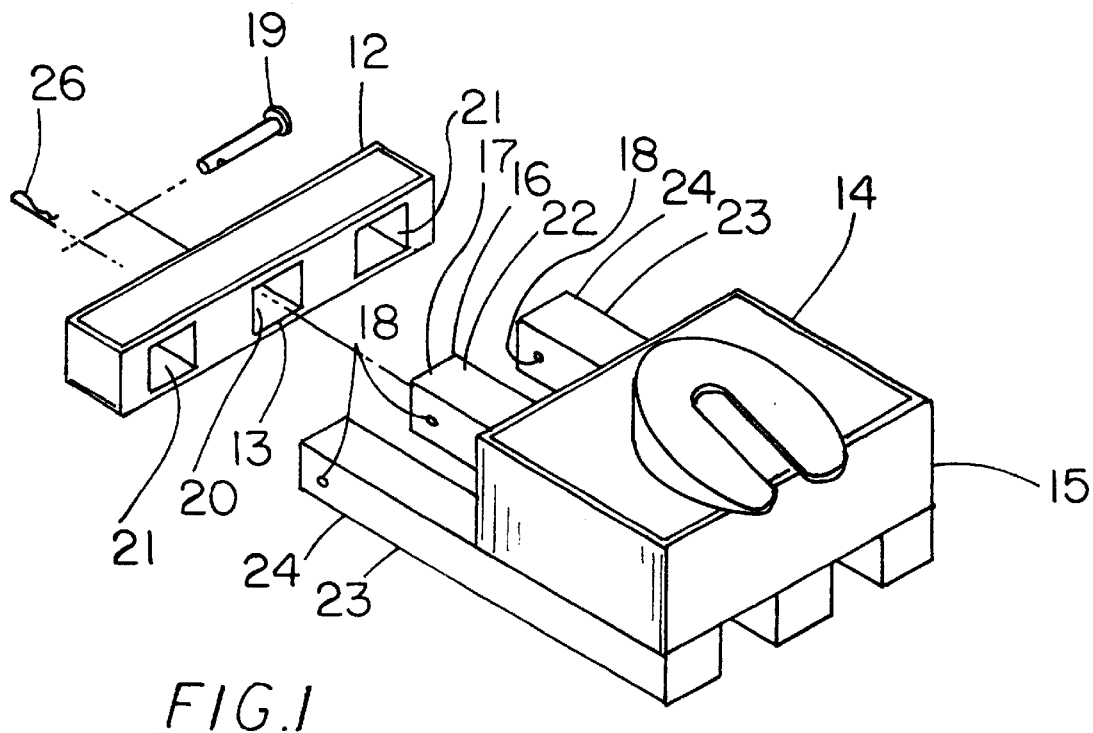
FIG. 1 is an exploded perspective view of a new fifth wheel trailer hitch adaptor system according to the present invention.
Figure 2:
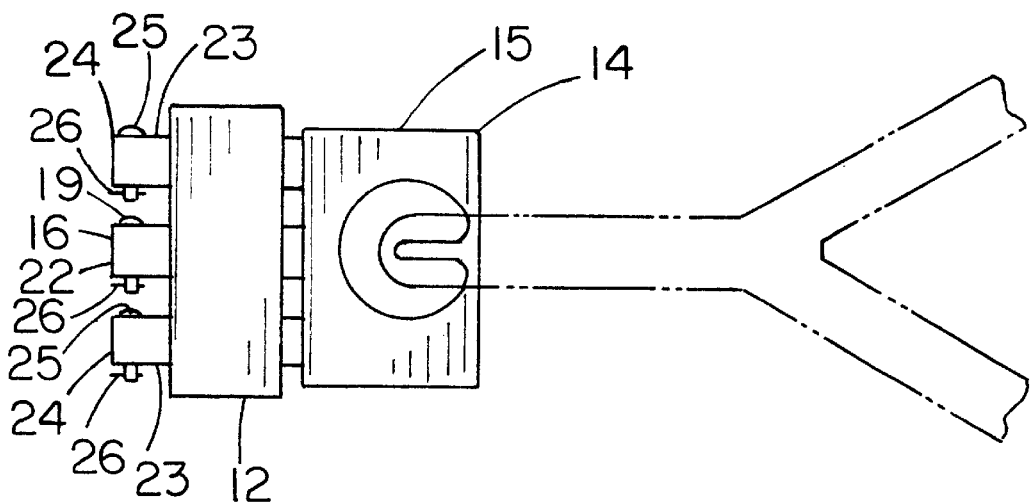
FIG. 2 is a top view of the present invention with a trailer connected to the fifth wheel trailer hitch member.

With reference now to the drawings, and in particular to FIGS. 1 through 3 thereof, a new fifth wheel trailer hitch adaptor system embodying the principles and concepts of the present invention and generally designated by the reference numeral 10 will be described.

As best illustrated in FIGS. 1 through 3, the fifth wheel trailer hitch adaptor system 10 generally comprises a vehicle 11. A receiver 12 is secured to the vehicle 11. The receiver 12 has an aperture 13 extending through the receiver 12.

A fifth wheel trailer hitch member 14 has a base portion 15. A connection bar 16 is secured to the base portion 15. The connection bar 16 has a distal portion 17 extending outwardly from the base portion 15. The distal portion 17 is insertable through the aperture 13 in the receiver 12. The distal portion 17 has a hole 18 extending through the distal portion 17. A pin member 19 is couplable to the distal portion 17 through the hole 18 whereby the connection bar 16 is secured to the receiver 12.

The aperture 13 through the receiver 12 is a central aperture 20. The receiver 12 has a pair of outer apertures 21 extending through the receiver 12 substantially parallel to the central aperture 20.

The connection bar 16 is a central connection bar 22. A pair of outer connection bar 23 are secured to the base portion 15. Each of the outer connection bar 23 has respective distal portions 24 extending outwardly from the base portion 15 parallel to the central connection bar 22. Each of the distal portions 24 of the outer connection bar 23 is insertable through an associated one of the outer apertures 21 in the receiver 12. Each of the distal portions 24 of the outer connection bar 23 has a respective hole 18 extending therethrough. Each of a pair of outer pin members 25 is couplable to an associated one of the hole 18s in the distal portions 24 of the outer connection bar 23 whereby the outer connection bar 23 are secured to the receiver 12. Each of the pin member 19s has a locking member 26 for securing the pin member 19s to the connection bar 16 and outer connection bar 23.

The connection bar 16 has a square cross-section taken transverse to a longitudinal axis of the connection bar 16. The aperture 13 in the receiver 12 has a complimentary shape for snugly receiving the connection bar 16 to minimize twisting of the connection bar 16 in the aperture 13.

The central connection bar 22 is positioned such that a longitudinal axis of the central connection bar 22 is aligned with a center of the fifth wheel trailer hitch member 14. Each of the outer connection bar 23 are positioned being symmetrically positioned about the longitudinal axis of the central connection bar 22.

In use, the user has a the receiver 12 mounted to the vehicle 11. The user then inserts the connection bar 16s of the fifth wheel trailer hitch member 14 to the receiver 12. The pin member 19s are then inserted through the hole 18s in the connection bar 16s to secure the fifth wheel trailer hitch member 14 to the receiver 12. The user can then hook a fifth wheel trailer to the fifth wheel trailer hitch member 14 for transport by the vehicle 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fifth wheel trailer hitch adaptor system for removably coupling a fifth wheel trailer to a vehicle, said system comprising:

a vehicle having a bumper mounted thereon;

a receiver secured to said bumper of said vehicle, said receiver being located below and adjacent to said bumper, said receiver having an aperture extending through said receiver;

a fifth wheel trailer hitch member having a base portion;

a connection bar secured to said base portion, said connection bar having a distal portion extending outwardly from said base portion, said distal portion being insertable through said aperture in said receiver, said distal portion having a hole extending through said distal portion;

a pin member couplable to said distal portion through said hole whereby said connection bar is secured to said receiver;

said aperture through said receiver being a central aperture;

said receiver having a pair of outer apertures extending through said receiver substantially parallel to said central aperture, each of said apertures having a longitudinal axis, said longitudinal axes of said apertures all lying in a common plane;

said connection bar being a central connection bar;

a pair of outer connection bars secured to said base portion, each of said outer connection bars having respective distal portions extending outwardly from said base portion parallel to said central connection bar, each said distal portions of said outer connection bars being insertable through an associated one of said outer apertures in said receiver, each said distal portions of said outer connection bars having a respective hole extending therethrough, each of said connection bars being elongate with a longitudinal axis, said longitudinal axes of said connection bars all lying in a common plane, said fifth wheel trailer hitch member being positioned above the common plane of said connection bars;

a pair of outer pin members, each of said outer pin members being couplable to an associated one of said holes in said distal portions of said outer connection bars whereby said outer connection bars are secured to said receiver;

said connection bar having a square cross-section taken transverse to a longitudinal axis of said connection bar;

said aperture in said receiver having a complementary shape for snugly receiving said connection bar to minimize twisting of said connection bar in said aperture;

said central connection bar being positioned such that a longitudinal axis of said central connection bar is aligned with a center of said fifth wheel trailer hitch member;

each of said outer connection bars being positioned being symmetrically positioned about said longitudinal axis of said central connection bar.

* * * * *